3,380,903
PHOTOSENSITIZATION METHOD OF CYCLIZATION OF MYRCENE
Robert S. H. Liu, Wilmington, Del., and George S. Hammond, Pasadena, Calif., assignors, by mesne assignments, to the United States of America as represented by the United States Atomic Energy Commission
No Drawing. Filed May 4, 1965, Ser. No. 453,213
12 Claims. (Cl. 204—162)

This invention relates to a novel reaction whereby myrcene is converted to 5,5-dimethyl-1-vinyl-bicyclo (2.1.1) hexane in the presence of a sensitizer.

Previously, it has been reported that the direct irradiation of myrcene (2-methyl-6-methylene-2,7-octadiene) gives a complex mixture in which 1-(4-methyl-3-pentenyl)cyclobutene-1 is the major product and B-pinene is the minor product. In contrast thereto, it has been found that when myrcene is irradiated in the presence of certain sensitizers, as hereinafter more fully defined, the nature of the reaction is fundamentally altered with the result that the product produced consists almost entirely of 5,5-dimethyl-1-vinylbicyclo (2.1.1) hexane.

Accordingly, it is an object of this invention to provide for a novel reaction involving myrcene.

More particularly, it is an object of this invention to provide for a novel reaction involving myrcene using certain sensitive compounds which absorb light energy and then transfer it to the myrcene to influence the reaction.

Another object of this invention is to provide for a novel useful hydrocarbon composition of matter.

These, and other objects of our invention will, it is believed, be apparent from the detailed description which follows.

According to the present invention, it has been found that by the intermolecular transfer of electronic excitation using sensitizer compounds, myrcene is converted to 5,5-dimethyl-1-vinylbicyclo (2.1.1) hexane in good yield. The sensitizer compound is generally a material which strongly absorbs wave lengths which are longer than the wave lengths myrcene strongly absorbs, and has a triplet excitation energy higher than myrcene. In general, the sensitizer compounds are materials which strongly absorb wave lengths above 3200 A. and more, particularly within the range from about 3200 A. to 4500 A. The preferred compounds are those which absorb strongly at about 3650 A., the mercury line.

While not bound by any theory, it is believed that the radiant energy absorbed by the sensitizer compound is transferred to the myrcene during the course of the reaction. Since the sensitizer compound has a triplet excitation energy higher than that of myrcene, it is generally capable of transferring this energy to the diene unit of myrcene followed by addition of the diene triplet to the double bond in the myrcene. For this reason, the sensitizer may be regarded as a donor of triplet excitation energy. The sensitizers, upon radiation, become loaded with energy which they then transfer in large quanta to the myrcene. The great energy transfer involved in the process of this invention is surprisingly effective and efficient.

The following are typical sensitizer compounds used in this invention: propiophenone, xanthone, acetophenone, 1,3,5-triacetylbenzene, isobutyrophenone, 1,3-diphenyl-2-propanone, benzaldehyde, triphenylmethyl phenyl ketone, carbazole, diphenylene oxide, triphenylamine, dibenzothiophene, o-dibenzoylbenzene, benzophenone, 4,4'-dichlorobenzophenone, p-diacetylbenzene, fluorene, 9-benzoylfluorene, triphenylene, p-cyanobenzophenone, thioxanthone, phenylglyoxal, anthraquinone, phenanthrene, a-naphthoflavone, flavone, ethyl phenylglyoxalate, 4'4,-bis(dimethylamino)-benzophenone, naphthalene, p-naphthyl phenyl ketone, p-naphthaldehyde, p-acetonaphthone, α-naphthyl phenyl ketone, α-acetonaphthone, α-naphthaldehyde, 5,12-naphthacenequinone, biacetyl, acetylpropionyl, benzil, fluorenone, and pyrene. The preferred sensitizers are benzophenone, β-acetonaphthone, or fluorenone.

While not critical, the sensitizers are generally employed in an effective sensitizing amount of from about 1% to about 50% by weight of the myrcene.

The radiation source used to activate the sensitizer compounds may be any common source of such energy, including both visible and ultraviolet radiation, capable of providing wavelengths strongly absorbed by the sensitizer. However, the preferred radiation source is a medium pressure mercury arc.

The reaction is preferably, although not necessarily, carried out in a hydrocarbon solvent such as hexane, benzene or isopentane.

The following examples are presented solely to illustrate the invention and should not be regarded as limiting in any way.

EXAMPLE 25 grams of myrcene and about 2½ grams of β-acetonaphthone were dissolved in sufficient hexane to give 500 grams of solution. Nitrogen was bubbled through the solution for five minutes and the solution was then irradiated for 24 hours with a 450-watt medium pressure mercury arc housed in a Hanovia immersion reactor. The reaction mixture was concentrated by rotary evaporation with aspirator suction, and then vacuum distilled. The photo product is isolated by vapor phase chromatography. The structure of the 5,5-dimethyl-1-vinylbicyclo (2.1.1) hexane was clearly indicated by the NMR spectrum. The low-field signals had a relative area of 3.0 and fall into the ABC in pattern characteristic of vinyl groups. The two strong unsplit signals at $\tau 8.886$ and $9.25$ have relative areas of 3.1 and 2.9 (tetramethylsilane as an internal standard). The signals indicated the two isolated methyl groups. A doublet with total relative area 1.1 is centered at 9.03 with a coupling constant of 8.0 c.p.s. A slightly distorted $A_2B_2$ group having a relative area 4.0 was centered at about $\tau 8.35$, is assigned to the protons attached to the 2-carbon bridge and the broad signal area 2.0 centered at $\tau 7.96$ includes the exo-methylene and bridgehead protons.

The novel cyclic compound of this invention contains ethylenic unsaturation, and hence, may be polymerized using conventional polymerization catalysts to provide high molecular weight polymers. As will be immediately apparent to those skilled in the art, these polymers will find many uses as extenders for other essentially hydrocarbon polymers, in coatings for metal wooden parts and the like, and for the production of films.

Having fully described the invention, it is intended that it be limited only by the lawful scope of the appended claims.

We claim:

1. The method of producing 5,5-dimethyl-1-vinylbicyclo (2.1.1) hexane which comprises exposing myrcene to radiation having wavelengths longer than the wavelengths strongly absorbed by myrcene in the presence of an effective amount of a sensitizer compound which strongly absorbs said wavelengths and has a triplet excitation energy higher than myrcene.

2. The method of claim 1 wherein the myrcene is dissolved in a hydrocarbon solvent.

3. The method of claim 1 wherein the myrcene is dissolved in n-hexane.

4. The method of claim 1 wherein the irradiation is provided by a medium pressure mercury arc.

5. The method of claim 1 wherein the myrcene is dissolved in benzene.

6. The method of claim 1 wherein said sensitizer compound is present in an amount of from about 1% to about 50% by weight of the myrcene.

7. The method of producing 5,5-dimethyl-1-vinylbicyclo (2.1.1) hexane which comprises exposing myrcene to radiation having wavelengths longer than the wavelengths strongly absorbed by myrcene in the presence of an effective amount of a sensitizer compound which strongly absorbs wavelengths between from about 3200 A. to 4500 A., and has a triplet excitation energy higher than myrcene.

8. The method of claim 7 wherein said sensitizer compound is present in an amount of from about 1% to about 50% by weight of the myrcene.

9. The method of producing 5,5-dimethyl-1-vinylbicyclo (2.1.1) hexane which comprises exposing myrcene to radiation having wavelengths longer than the wavelengths strongly absorbed by myrcene in the presence of benzophenone.

10. The method of producing 5,5-dimethyl-1-vinylbicyclo (2.1.1) hexane which comprises exposing myrcene to radiation having wavelengths longer than the wavelengths strongly absorbed by myrcene in the presence of β-acetonaphthone.

11. The method of producing 5,5-dimethyl-1-vinylbicyclo (2.1.1) hexane which comprises exposing myrcene to radiation having wavelengths longer than the wavelengths strongly absorbed by myrcene in the presence of fluorenone.

12. The method of producing 5,5-dimethyl-1-vinylbicyclo (2.1.1) hexane which comprises irradiating myrcene with a medium pressure mercury arc in the presence of a sensitizer compound.

References Cited

UNITED STATES PATENTS 2,762,768   9/1956   Cier _____ 204—162

OTHER REFERENCES

Crowley, Proc. Chem. Society, 254, 334 (1962).

HOWARD S. WILLIAMS, *Primary Examiner*.